Patented Aug. 8, 1939

2,168,827

UNITED STATES PATENT OFFICE 2,168,827

PROCESS OF MAKING VINYL-ACETAL RESINS

George O. Morrison and Aubrey F. Price, Shawinigan Falls, Quebec, Canada, assignors to Shawinigan Chemicals Limited, Montreal, Quebec, Canada, a corporation of Canada No Drawing. Application December 26, 1934, Serial No. 759,318. In Great Britain December 28, 1933

23 Claims. (Cl. 260—73)

This invention relates in general to improvements in polyvinyl resins and processes of making same and relates more particularly to improvements in resins prepared by hydrolysis of polyvinyl esters and especially polyvinyl acetate and condensation of the hydrolysis products with a body containing an active carbonyl group, such as an aldehyde or body yielding an aldehyde, and especially formaldehyde or a body yielding formaldehyde, and relates also to products made from such resins and to processes of making the resins and products therefrom. The present invention is also an improvement on the processes and resins disclosed in U. S. Patent No. 2,036,092, granted March 31, 1936.

According to the aforesaid patent, polyvinyl esters are partially or completely hydrolyzed in presence of a solvent, water and an acid reacting catalyst and the hydrolysis products are condensed with an aldehyde, the condensation taking place either simultaneously with or subsequently to hydrolysis. During hydrolysis, acyl groups of the ester are replaced by hydroxyl groups and, during the condensation, the hydroxyl groups are reacted with aldehyde to form acetal groups.

The primary object of this invention is to produce improved resins of the above type, in which the improvement resides in one or more of the following characteristics, namely, substantial absence of colour; substantial imperviousness to water and dilute alkalis; great strength, toughness, flexibility and elasticity; reasonable non-inflammability; high softening temperature; stability; and insolubility in numerous common organic solvents.

A further object is to produce resins suitable for the manufacture of sheets, rods, tubes and the like from which formed articles may be made by cutting, stamping, pressing or other suitable methods; films for wrapping and photographic purposes; safety glass; threads for manufacture of artificial silk; high class surface coating compositions such as required for liners for bottle caps and other uses where insolubility in all ordinary solvents, non-toxicity and freedom from colour and odour are of the utmost importance; high class mouldings such as dentures; and for other purposes.

A still further object is to provide an improved process for the manufacture of resins as hereinbefore described.

Another object is to produce resins in the form of sheets, films, threads or fine granules directly from the solutions in which the resins are formed.

Various other objects and the advantages of the invention may be ascertained from the following description.

The foregoing objects are realized according to this invention by observing certain conditions which are essential to the realization of one or more of the stated characteristics in the resins.

It has been found that, in order to produce substantially colourless resins of the character described in the aforesaid application, it is necessary to use a suitable catalyst, and if this is an acid, it is necessary also to protect the resins against the discolouring action of the catalyst acid and, in some cases, to protect the aldehyde against the resinifying action of the catalyst acid on the aldehyde itself, and it has been found that the foregoing may be accomplished by carrying out the reaction in presence of a sufficient amount of water or alcohol or both. The protective action of alcohols is due partly to dilution of the catalyst acid thereby, partly to the reaction of alcohol with aldehyde to form acetals which are less subject to discolouration by the catalyst acid and partly to other causes. The protective action of water is due largely to dilution of the acid thereby. Water is preferable to alcohol in many instances as a protective agent as it protects the resin and/or the aldehyde from the catalyst acid and does not interfere with the concentration of aldehyde in the reaction mixture by combination to form an acetal. If it is desirable to avoid the use of alcohols or ester alcohol mixtures, materials which are solvents for the resin and which permit of the addition of considerable water are indicated. It has been found that aliphatic acids, such as acetic acid or propionic acid, or other solvents, such as dioxane, acetone and the like, are suitable solvents in which to carry out the reaction and that, when such solvents are used, it is necessary to use sufficient water to replace the protective action of the alcohol. So far as colour alone is concerned, there does not appear to be any upper limit to the amounts of water or alcohol or both that may be used, but upper limits are imposed by other considerations, such as economy, time and characteristics of the resin other than colour.

It has been found also that, contrary to what might be expected in view of its well known charring action on organic matter, sulphuric acid is preferable to hydrochloric acid in that, when properly diluted, sulphuric acid has less tendency than hydrochloric acid to produce coloured resins.

It has been found further that, in order to produce resins having a high degree of resistance to water and dilute alkalies, it is necessary to effect a high percentage reaction between hydroxyl groups and carbonyl groups and that, other conditions being correct, attainment of this high percentage reaction depends upon limiting the amounts of water or alcohol or both in the reaction mixture to such extent as is necessary to obtain homogeneous reaction conditions, especially toward the end of the reaction, i. e. when the acetal reaction exceeds 80%. By "homogeneous conditions", we mean that the reaction medium is a solution, colloidal or otherwise. So far as the acetal reaction alone is concerned, the alcohol and/or water could well be dispensed with but the resins produced would be dark coloured and useless for many purposes though admirable for others.

It has been found still further that in order to produce resins of improved strength, toughness, elasticity and high softening temperature, it is necessary to avoid using polymers of relatively low molecular weight and to secure a high percentage hydrolysis.

The expression "hydrolysis product of polyvinyl ester", or equivalent expression, as hereinafter used, is to be understood as indicating a substitution product of a polyvinyl ester in which product the molecule contains free hydroxyl groups capable of reacting with a body containing active carbonyl groups and irrespective of whether the molecule does or does not contain a residue of acyl groups and irrespective of whether it has or has not been partially reacted with a body containing carbonyl groups.

Broadly speaking the invention resides as to process in condensing an hydrolysis product of a polyvinyl ester with a body containing active carbonyl groups under conditions as to polymer identity and viscosity, solvent, catalyst, carbonyl containing body, proportions, times, temperatures and pressures so adjusted and related according to the teaching hereinafter contained as to produce resins having one or more of the hereinbefore mentioned characteristics. As to product, the invention resides broadly in resins being condensations of hydrolysis products of polyvinyl esters with bodies containing active carbonyl groups and characterized by substantial absence of colour or by an acetal content and a low percentage of free hydroxyl groups, corresponding to an acetal reaction of preferably not less than 90%, or by both substantial absence of colour and high percentage hydroxyl replacement.

More particularly, the invention resides in a process and resins, as last above stated, in which the carbonyl containing reactant is formaldehyde or a body liberating formaldehyde in the reaction, for example, formalin, paraformaldehyde or diethylmethylal, and resides also in the particular solvents, catalysts, times, temperatures, modes or features of treatment and combinations or relations of these necessary to produce resins which have one or more of the characteristics previously mentioned.

In greater detail, the invention comprises the features and combinations of features disclosed in the foregoing and following description, together with such modifications thereof and substitutions therefor as are taught by the disclosure herein or as lie within the scope of the appended claims.

As previously stated, the hydrolysis reaction and the acetal reaction may be carried out sequentially or simultaneously. If these reactions are carried out separately, the catalyst and/or reaction media used in the one may be different from the catalyst and/or reaction media used in the other, or both reactions may be carried out using the same catalyst and reaction media.

It is preferred, however, to carry out the reactions simultaneously and this manner of operation imposes restrictions on the choice of catalyst.

For either hydrolysis or acetal reaction alone and for simultaneous hydrolysis and acetal reactions, suitable catalysts are sulphonic acids, certain strong semiorganic acids, for example, trichloracetic acid, and the mineral acids, particularly sulphuric acid. Other materials, such as certain metal chlorides or sulphates, for example, zinc chloride, calcium chloride or sodium acid sulphate, which are known catalysts for acetal reactions, are not as desirable hydrolysis catalysts as those already named, but may be used to catalyze the acetal reaction when the same is performed subsequently to the hydrolysis.

The polymer viscosities herein referred to are determined according to the following method:—

The polymer is dissolved in benzene and made up so that at 20° C. one litre contains the simple molecular weight in grammes. This is filtered into the apparatus through cotton-wool, precautions being taken to avoid loss of solvents. The time of outflow is then determined by the Ostwald viscosimeter, which has been standardized on a pure solvent (benzene) of which the absolute viscosity is known in centipoises.

A convenient method of determining softening temperatures of the resins is to place 10 grammes of mercury over a plug of the resin ¼ inch deep at the lower end of a 7 mm. tube and raise the temperature at the rate of 4° C. per minute. The temperature at which the mercury runs out is the softening temperature of the resin.

The following three comparative examples illustrate the carrying out of the invention at atmospheric pressure and using three different solvents and producing by simultaneous hydrolysis and acetal reactions, resins which are substantially colourless and are characterized by a high percentage acetal reaction.

*Example 1*

100 parts of polymerized vinyl acetate having a viscosity of 15 centipoises is dissolved in a mixture of 118 parts butyl acetate and 66 parts butyl alcohol. To this are added 32 parts paraformaldehyde, 15 parts water and 6.8 parts concentrated sulphuric acid. The reaction is carried on for 15 hours at 70° C. in an enamelled vessel fitted with an agitator. 13 parts of ammonia solution (sp. gr. 90) is added, which is an excess over that required to neutralize the catalyst acid.

The resin is recovered from the reaction mixture by steam distillation or other suitable means, washed to remove salts and dried in a vacuum drier.

The finished resin is practically free from colour, 74% of the acyl groups have been removed and their replacement by reaction with formaldehyde is 92.2% complete.

This resin is a hard, tough material, soluble in acetic acid, dioxane, chloroform, tetrachlorethane, ethyl acetate and acetone and insoluble or practically so in benzene, toluene, alcohols, btuyl acetate and higher acetates. It is useful as a protective coating and for manufacture of sheets, rods and the like and in the manufacture of safety glass.

Butyl alcohol has a definite effect on both the colour of the resin and the completeness of the acetal reaction. If more alcohol is used than is equivalent to the aldehyde present, then low percentage acetal reaction is encountered and, where high concentrations of polyvinyl acetate coupled with high percentage hydrolysis are used, then the solvent mixture is a poor solvent for both the polyvinyl acetate and the formed resin. By "alcohol equivalent to aldehyde" is meant that amount of alcohol necessary to combine with all the aldehyde to produce an acetal. If less alcohol is used, than is equivalent to one-third of the aldehyde present, then color difficulties are encountered. Water has a definite effect on both the colour of the resin and the completeness of the acetal reaction. If more than 8% of water, based on the original polyvinyl acetate solution, is used, solubility difficulties due to separation or precipitation of the resin are encountered. If less than 1% of water, based on the original polyvinyl ester solution, is used, colour difficulties are encountered. Since both butyl alcohol and water have similar influence during the reaction, it is advisable when approaching the maximum limits of the other to approach the minimum limits of the other. Wide limits in temperature can be used varying from room temperature or below to well above the boiling point of the solvent mixture employed. Since butyl compounds are relatively poor solvents for resins from polyvinyl acetate and formaldehyde, only those resins of low percentage hydrolysis can be made at low temperatures. The preferred temperature range is 50° to 80° C. for this type of resin in which the hydrolysis is 75%. The amount of catalyst acid used is governed by the nature of the acid, the temperature employed, the amount of water used and the desired rate of reaction. If more than 5% of sulphuric acid based on the original polyvinyl ester solution is used, colour difficulties are encountered and, if less than 0.6% acid is used, lower percentage acetal reaction is encountered. The ratio of acid to water should not be greater than 1:2. The maximum temperature employed with 0.6% of acid is 90° C. Lowering or raising the temperature 10° C. should be accompanied by a doubling or halving of the amount of acid. Lower temperatures than the above maximum limits may be used but difficulties are encountered due to the poor solvent properties of butyl compounds for resins from polyvinyl acetate and formaldehyde. Due to the poor solvent properties of butyl compounds for these resins, the butyl compounds cannot be used for the preparation of these resins with hydrolyses much above 80% if homogeneous conditions are to be maintained.

*Example 2*

100 parts of polymerized vinyl acetate having a viscosity of 15 centipoises is dissolved in a mixture of 146 parts ethyl acetate and 39 parts ethyl alcohol. To this are added 32 parts of paraformaldehyde, 14.3 parts water and 13.5 parts concentrated sulphuric acid. The reaction is carried on for 15 hours at 60° C. as in Example 1. The catalyst acid is neutralized and the resin is worked up as in Example 1 or the reaction mixture may be precipitated as threads in water, washed and dried in a current of warm air.

The finished resin is practically free from colour, 83% of the acyl groups have been removed and their replacement by reaction with formaldehyde is 93% complete.

This resin is a hard, tough material, the solubilities of which are substantially similar to those of the resin of Example 1, and has the same uses.

Ethyl alcohol has a definite effect on both the colour of the resin and the completeness of the acetal reaction. If more alcohol is used than is equivalent to the aldehyde present, low percentage acetal reactions are encountered. If less alcohol is used than is equivalent to one-third of the aldehyde present, then colour difficulties are encountered. Water has a definite effect on both the colour of the resin and on the completeness of the acetal reaction. If more than 16% of the acetal reaction. If more than 16% of water based on the original polyvinyl ester solution is used, low percentage acetal resins are produced and, if the water is less than 1%, colour difficulties are encountered. Since both ethyl alcohol and water have similar influence during the reaction, it is advisable when approaching the maximum limits of one to approach the minimum limits of the other. The temperature can vary between wide limits ranging from room temperature or below to well above the boiling point of the solvent mixture employed. The preferred temperature range using ethyl compounds is between 30° and 80° C. The amount of catalyst acid used is governed by the nature of the acid, the temperature selected, the amount of water used and the desired rate of reaction. If more than 10% of sulphuric acid based on the original polyvinyl ester solution is used, colour difficulties are encountered and, if less than 0.6% of acid is used, lower percentage acetal reaction is encountered. The ratio of acid to water should be not greater than 1:1. The maximum temperature employed with 0.6% of acid is 90° C. Lowering or raising the temperature 10° C. should be accompanied by a doubling or a halving of the amount of acid. Lower temperatures than the maximum limits may be used and lower temperatures for a given set of conditions improve the colour and adversely affect the percentage acetal reaction.

*Example 3*

100 parts of polymerized vinyl acetate having a viscosity of 15 centipoises is dissolved in 185 parts of glacial acetic acid. To this is added 32 parts paraformaldehyde, 40 parts water and 6.8 parts of concentrated sulphuric acid. The reaction is carried on for 25 hours at 70° C. in an enamelled vessel fitted with an agitator. 13 parts of ammonia solution is added to neutralize the catalyst acid and the reaction mixture is precipitated as threads or granules in water, washed, and dried in a current of warm air.

The finished resin is substantially colourless, 93.3% of the acyl groups have been removed and their replacement by reaction with formaldehyde is 92.5% complete.

The proportion of polyvinyl acetate to acetic acid can be varied widely, but if the ratio of acetic acid to water approaches 1:1, solubility difficulties are encountered.

Water has a definite effect on both the colour of the resin and on the completeness of the acetal reaction. If more than 30% of water based on the original polyvinyl acetate solution is used, low percentage acetal reaction results and, if less than 8% of water is used, colour difficulties are encountered. The temperature can vary between wide limits ranging from room temperature or below to well above the boiling point of the solvent mixture. The preferred temperature range using acetic acid as solvent is between 30° and 80° C. The amount of catalyst acid used is governed by the nature of the acid, the temperature employed, the amount of water used and the desired rate. If more than 10% of sulphuric acid based on the original polyvinyl ester solution is used, colour difficulties are encountered and, if less than 0.6% of catalyst acid is used, lower percentage acetal reaction is encountered. The ratio of catalyst acid to water should not be greater than 1:3. The maximum temperature that may be employed with 0.6% of catalyst acid is 90° C. Lowering or raising the temperature 10° C. should be accompanied by doubling or halving the amount of catalyst acid. Lower temperatures than the maximum limits may be used and lower temperatures for a given set of conditions improve the colour of the resin, but adversely affect the percentage acetal reaction.

Resins produced according to the teaching in connection with any of the foregoing examples and within the limits set forth in the teaching are characterized by substantial absence of colour and by acetal reaction of 90% or higher. As one progresses upwards from the lower of said limits of water and/or alcohol and downwards from the upper of said limits of catalyst acid and temperature, substantial absence of colour is maintained but the percentage acetal reaction falls off gradually. Conversely, as one progresses downwards from the upper of said limits of water and/or alcohol and upwards from the lower of said limits of catalyst acid and temperature, the percentage acetal reaction increases gradually from approximately 90% but, after the lower of said limits of water and/or alcohol and the upper of said limits of catalyst acid and temperature are passed, colour becomes evident and increases rapidly.

The proportions of solvent to polymer depend chiefly upon the viscosity of the polymer and the nature of the solvent, the proportions being preferably such as will produce a reaction solution of viscosity convenient for working. For example, solutions having viscosity of 20 to 100 poises at 20° C. have been found convenient, but solutions of lower and higher viscosities may be used.

The proportion of aldehyde to polymer depends upon the percentage hydrolysis and acetal reaction desired and the amount ranges upwards from a minimum of approximately 25% excess over that theoretically required to form the desired polyvinyl acetal.

Since most of the variables involved in the combined hydrolysis and acetal reaction are interrelated and some are selective at will for convenience or expediency, it is impossible to give numerical limits covering at the same time the whole range of polymer viscosities, polymer concentrations in solution or percentage hydrolysis which can be used. A set of proportion limits suitable for a polymer of given viscosity or given concentration in a given solvent might be ridiculous or impossible for a polymer of widely different viscosity or for a widely different polymer concentration in solution or for a different solvent.

Limits of catalyst acid, water, alcohol and temperature and the relations of these as set forth in connection with Examples 1, 2 and 3 apply to conditions of polymer viscosity, polymer concentration in solution and to the solvents as stated in these examples and to a limited range above and below.

The principles involved apply to the entire range of polymer viscosities, polymer concentration in solution and percentage hydrolysis and the application of these principles throughout the ranges of polymer viscosities, polymer concentrations in solution and percentage hydrolysis will be readily understood by those skilled in the art, from the teaching of the examples and the observations following each.

The proportions of constituents in the reaction media change continuously throughout the course of the reactions and the limits given in connection with Examples 1, 2 and 3 are intended to include all resulting proportions encountered during progress of the reactions. These conditions may be approached by employing combinations of initial conditions outside the limits given or other materials capable of giving similar conditions during the course of the hydrolysis.

The foregoing examples, in all of which the viscosity of the polymer and concentration of polymer in solution are the same, have been selected in order to show clearly the limitations of variations of the other variables. The following examples serve to illustrate application of the foregoing principles to a wide range of polymer viscosities, and a considerable range of polymer concentrations in solution.

*Example 4*

100 parts of polymerized vinyl acetate having a viscosity of 2.5 centipoises is dissolved in 100 parts of glacial acetic acid. To this are added 88 parts of formalin solution (38% HCHO) and 4.74 parts of concentrated sulphuric acid. The reaction is carried on for 24 hours at 70° C. in an enamelled vessel fitted with an agitator, 9 parts of ammonia solution is added, which is an excess over that required to neutralize the catalyst acid. The resin is recovered from the reaction mixture by any suitable means, washed to remove salts and dried.

The finished resin is pale yellow in colour, 93.6% of the acyl groups have been removed and reaction of the substituted hydroxyl groups with formaldehyde is 92.5% complete.

The amount of acetic acid used can be varied, 67 parts give satisfactory reaction conditions and, of course, more than 100 parts may be used. The amount of formalin solution may vary widely. When less than 55 parts are used, there is a tendency for the percentage acetal reaction to be lowered. More formalin may of course be used, the limiting factor being the presence of too much water, so that solution conditions are upset.

The temperature may vary; lower temperature, using the above proportions would mean slower hydrolysis rate, and resin freer from color, while the percentage acetal reaction would remain approximately unchanged. Higher temperature would increase the rate of reaction and tend to darken the resin. The temperature chosen is governed by the color limits allowed in the finished resin.

The neutralizing material should be slightly in excess of that necessary to neutralize the mineral acid. Bases, weak acid salts or carbonates are satisfactory. For some purposes, materials which give soluble sulphates and/or acetates, such as potassium or ammonia, are preferable.

This resin is a hard, easily crushed material and is soluble in acetic acid, dioxane, chloroform, tetrachlorethane, etc., and insoluble, or practically so, in benzene, toluene, alcohols and esters such as ethyl, butyl, etc. It is useful as a protective coating and for other purposes where its solubility properties and the low viscosity of its solutions are advantageous.

Example 5

100 parts of polymerized vinyl acetate having a viscosity of 6 centipoises is dissolved in 150 parts glacial acetic acid. To this are added 72 parts of formalin solution (38% HCHO) and 5.5 parts of concentrated sulphuric acid. The reaction is carried on for 21 hours at 70° C., the catalyst neutralized and the resin worked up as in Example 4.

The finished resin is substantially colorless, 89.0% of the acyl groups have been removed and their replacement by reaction with formaldehyde is 90.7% complete.

This resin is a hard material which has the same solubility as the resin in Example 4. It is useful as a protective coating and can be used for moulding purposes alone or when incorporated with suitable fillers, dyes, pigments and plasticizers, to produce a wide variety of articles such as dentures, drinking vessels, toilet articles, ornaments, portions of electrical apparatus and many others.

For the production of resins having great strength, flexibility, elasticity and high softening temperature and which are insoluble in numerous common organic solvents, it is necessary, when working with polyvinyl acetate, (i) That the polyvinyl acetate used have a viscosity of not less than 10 centipoises (as determined by the method previously given) corresponding to an average molecular weight believed to be approximately 15,000, and preferably have a viscosity above 15 centipoises corresponding to an average molecular weight believed to be approximately 22,500;

(ii) That the ester be at least 80% and preferably above 90% hydrolyzed, i. e., that the acyl groups be replaced to a minimum extent of 80% and preferably above 90% during the hydrolysis;

(iii) That the acetal reaction proceed to at least 90% of completion, i. e., that the hydroxyl groups introduced by hydrolysis be at least 90% replaced by acetal groups during the condensation with aldehyde.

Where very high softening points and elasticity are required, as in threads or films, it is desirable to use polyvinyl acetate with viscosity of or over 45 centipoises, corresponding to an average molecular weight believed to be approximately 67,500, and to hydrolyze the same over 90%.

Example 6

100 parts of polymerized vinyl acetate having a viscosity of 15 centipoises is dissolved in a mixture of 111 parts ethyl acetate and 74 parts ethyl alcohol. To this are added 32 parts of paraformaldehyde, 14 parts of water and 6.75 parts concentrated sulphuric acid. The reaction is carried on for 16 hours at 70° as in Example 4. The neutralized reaction liquid is precipitated as threads in water, washed and dried in a current of warm air.

The finished resin is practically free from color, 97% of the acyl groups have been removed and their replacement by reaction with formaldehyde is 92% complete.

The resin is in the form of white threads, which can be dissolved readily to give a clear, faintly colored varnish in the same solvents as outlined in Example 4.

It is a very useful material as a surface coating, for example, on bottle caps or liners therefor and for films, rods, etc. where its great strength, hardness, resistance to water, various solvents etc. are indicated. Sheets of this resin, with or without plasticizers, are an excellent material for use in the manufacture of safety glass.

Example 7

100 parts of polymerized vinyl acetate having a viscosity of 45 centipoises is dissolved in 300 parts glacial acetic acid. To this are added 124 parts of formalin solution (38% HCHO) and 9.5 parts concentrated sulphuric acid. The reaction is carried out for 12½ hours at 70° C. as in Example 4. The resin is worked up as in Example 6, or instead of precipitating the resins in thread form in water, as described in the examples, water may be added to the reaction mixture, with or without previous neutralization of the catalyst acid, until with agitation the resin is precipitated in small granules which may be separated from the liquid by filtration or otherwise. The addition of water is preferably such as to bring the acetic acid concentration down to 15% to 25% of the reaction mixture. This method of recovering the resins is particularly applicable to those of high hydrolysis and high acetal reaction. This method of recovering the resin is particularly useful in connection with resins made in acetic acid, as both the solvent acid and that liberated during the reaction may be readily recovered.

The finished resin is practically free from colour, 89% of the acyl groups have been removed and their replacement by reaction with formaldehyde is 94% complete.

This resin resembles that in Example 6 but is stronger and tougher.

Example 8

100 parts of polyvinyl acetate having a viscosity of 150 centipoises is dissolved in 570 parts of glacial acetic acid. To this are added 200 parts formalin solution (38% HCHO) and 15 parts concentrated sulphuric acid. The reaction is carried out for 30 hours at 70° C. and the resin is separated as in Example 7.

The resin is substantially colourless and is materially tougher, stronger and more elastic than the resins of Examples 6 and 7 and is insoluble in most organic solvents. The hydrolysis has gone 92% and the acetal reaction 94.7%.

Example 9

100 parts of polyvinyl acetate having a viscosity of 15 centipoises is dissolved in a mixture of 102 parts ethyl alcohol and 83 parts of 95% ethyl acetate. To this is added 34 parts paraformaldehyde, 6.8 parts of sulphuric acid, (s. g. 1.84) and 11.5 parts of water. The mixture is placed in a suitable vessel, preferably enamel lined, fitted with an efficient agitator and is heated under a refluxing condenser at approximately 70° C. for eleven hours. Alternatively, the mixture may be heated in a closed vessel without the reflux condenser. At the end of the above treatment, it will be found that the ester has been approximately 97% hydrolyzed and that the acetal reaction has gone about 93%. The resin produced remains in solution in the solvent, in which the proportion of ethyl acetate is considerably increased, owing to reaction of acetic groups, split off during hydrolysis, with the alcohol. The resin, if separated from the solvent and catalyst acid, is a transparent substantially water-white solid which, when dried, is insoluble in water, alcohol, benzene, toluene, acetone, ethyl acetate and butyl acetate, but is soluble in chloroform, acetic acid and dioxane.

*Example 10*

80 parts of polyvinyl acetate having a viscosity of 30 centipoises is dissolved in a solvent mixture as in Examples 9 and 28 parts paraformaldehyde, 6 parts sulphuric acid (s. g. 1.85) and 10 parts of water are added. The reaction is carried out as before and the resin, if separated from the solvent and catalyst acid and dried, has characteristics similar to the resin of Example 9 but more pronounced, i. e., the viscosity and softening point are higher and the resin is tougher and more elastic.

*Example 11*

The process of Example 10 is repeated using the same amount, or slightly less, of polyvinyl acetate having a viscosity of 50 or 60 centipoises. The resin produced has higher softening point and higher viscosity and is tougher and more elastic than the resin of Example 10.

From the teaching in connection with Examples 1 to 3 and the embodiments of this teaching in Examples 4 to 11, it will be apparent to those skilled in the art that resins characterized by substantial absence of colour and by high percentage acetal reaction may be produced using polymers of viscosities, polymer concentrations in solution, solvents, percentages of hydrolysis, catalysts and temperatures, one or more of which are outside their respective ranges as disclosed by the examples. The teaching in connection with Examples 1 to 3 relating to production of resins characterized by good colour irrespective of percentage acetal reaction and to production of resins characterized by high percentage acetal reaction irrespective of colour applies also to production of such resins under conditions within and beyond the wider ranges of polymer viscosities, polymer concentrations in solution, solvents and percentage hydrolysis disclosed by Examples 4 to 11.

The foregoing examples and the teaching in connection therewith cover variations of a process in which hydrolysis and acetal reaction are carried out simultaneously to produce resins characterized by substantial absence of colour or by high acetal reaction or by both high acetal reaction and substantial absence of colour and in which the hydrolysis may be partial or complete.

In practicing this invention, the hydrolysis reaction and the acetal reaction may be performed sequentially. The acetal reaction may follow immediately after the hydrolysis reaction using the reaction media of the hydrolysis with or without modification thereof, or the acetal reaction may be completely isolated from the hydrolysis reaction as to time, place and conditions, or the conditions may be intermediate.

The hydrolysis reaction may be carried out under various conditions so as to produce either coloured or colourless hydrolysis products. In the latter case, it is essential to carry out the hydrolysis in presence of sufficient water or water and alcohol to protect the polymer, its hydrolysis product and possibly the solvent, if any is used, against any discolouring action of the catalyst, substantially as explained in connection with simultaneous hydrolysis and acetal reactions.

An outstanding difference between an acetal reaction performed simultaneously with hydrolysis as already described and an acetal reaction performed subsequently to hydrolysis is the much wider range in the variety and amount of catalysts allowable in the latter case. These may range from the catalysts and amounts thereof as herein specified for simultaneous hydrolysis and acetal reaction through the same catalysts in lesser amounts, to other known catalysts for acetal reactions.

For production of substantially colourless acetal reaction products, it is necessary to start with a substantially colourless hydrolysis product and to protect the resin, and if necessary the aldehyde, from being discoloured by the catalyst. This protection ranges from the limits previously set forth for simultaneous hydrolysis and acetal reactions to as little protection as is required in the case of mild catalysts such as calcium chloride.

For production of resins with high percentage acetal reaction, the reaction media must be so adjusted that homogeneous conditions are obtained especially toward the end of the reaction, and the limits for alcohol, water, catalyst and temperature previously set forth for simultaneous hydrolysis and acetal reaction apply also to the separate acetal reaction, except in the case of mild catalysts where much larger amounts thereof are indicated.

For production of substantially colourless resins with high percentage acetal reaction, it is necessary to start with a substantially colourless hydrolysis product and to adjust the reaction media so as to obtain homogeneous conditions especially toward the end of the reaction and to work in the field which is common to the ranges last set forth for production of substantially colourless resins and for production of high acetal resins.

If the acetal reaction is carried out in the hydrolysis reaction media without modification thereof, it is obvious the conditions to obtain colourless resins with high acetal reaction must be as previously described for simultaneous hydrolysis and acetal reaction. If the catalyst remaining in the hydrolysis reaction media is neutralized and replaced by a milder catalyst or is partially neutralized, less water and/or alcohol and higher temperatures may be used without adversely affecting the colour of the resin and with benefit to the acetal reaction. It is to be noted that when the acetal reaction is effected in the unchanged hydrolysis media, hydrolysis will continue during the acetal reaction period in a manner similar to that set forth for simultaneous reaction.

The following examples illustrate processes for producing resins characterized by high percentage acetal reaction and substantial absence of colour, in which processes the hydrolysis and acetal reaction are sequential.

*Example 12*

100 parts of polyvinyl acetate having a viscosity of 10 centipoises is dissolved in 135 parts of glacial acetic acid. To this are added 40 parts of water and 6.8 parts of concentrated sulphuric acid. Hydrolysis is carried out during 7 hours at 70° C. in an enamelled vessel fitted with an agitator. 32 parts of paraformaldehyde is added and the reaction is carried on during another hour at 70° C. 13 parts of ammonia solution (sp. gr. 90) is added to neutralize the mineral acid and the resin is precipitated from the reaction mixture in water, washed and dried in a current of warm air.

Alternatively, the mixture is only initially heated and the reaction is allowed to proceed without external heating until the acetal reaction goes 90% or over. Alternatively, the initial heating may be omitted.

The finished resin is substantially colourless, 68% of the acyl groups have been removed and their replacement by reaction with formaldehyde is 92.7% complete.

The conditions as to water, catalyst and temperature may be varied within the limits given in connection with Example 3.

Alternatively, after the addition of the paraformaldehyde, the temperature may be allowed to drop to any desired temperature or the reaction mass may be cooled to any desired temperature. This will serve to slow down the hydrolysis during the acetal reaction period and will require slightly longer acetal reaction period.

*Example 13*

To 100 parts of substantially colourless polyvinyl alcohol prepared from polyvinyl acetate having a viscosity of 6 centipoises, there are added 350 parts of glacial acetic acid and 175 parts formalin (38% HCHO) in which 22 parts of zinc chloride has been dissolved. The mixture is reacted for 5 hours at 70° C. in an enamel lined vessel fitted with an agitator. At the end of this time, the acetal reaction has gone to 90% of completion and the resin when separated has the same characteristics as the resin produced according to Example 5.

Owing to the use of a mild catalyst, there is little or no need to observe precautions for protection of the resin or the aldehyde and, in consequence, the limits for protection against the catalyst taught in connection with Example 3 do not apply. On the other hand, the limits taught in connection with Example 3 as necessary to obtaining a high percentage acetal reaction do apply.

*Example 14*

A substantially colourless hydrolysis product of polyvinyl acetate in which the percentage hydrolysis is approximately 50% is prepared by hydrolyzing polyvinyl acetate of viscosity 2.5 centipoises for 6 hours at 60° C., in ethyl alcohol containing 5% of sulphuric acid. The catalyst is neutralized and the hydrolysis product separated from the solvent by steam distillation or other suitable means and washed to remove salts and dried. To 100 parts of this hydrolysis product, there are added 100 parts of ethyl acetate and 30 parts of ethyl alcohol, 50 parts of formalin solution (38% HCHO) and 0.7 part of concentrated sulphuric acid and the whole reacted together for 4 hours at 70° C., as in Example 13. The catalyst acid is neutralized by addition of 1.5 parts of ammonia solution and the resin is recovered by steam distillation or other suitable means, washed to removed salts and dried in a vacuum drier. The hydrolysis product need not be completely dried and, if a wet product is used in the acetal reaction, the water added in this way may be compensated for by replacing an appropriate amount of the formalin solution with paraformaldehyde.

The finished resin is substantially colourless, approximately 52% of the acyl groups have been removed and the acetal reaction is 91% of complete.

The amounts of water and alcohol may be varied, but for a high percentage acetal reaction one must not exceed the limits in this connection previously set forth for simultaneous hydrolysis and acetal reaction. The limits of alcohol, water and temperature previously given for simultaneous hydrolysis and acetal reaction to obtain colourless resins may be exceeded since much less catalyst acid is used.

From all the foregoing teaching, it will be apparent to those skilled in the art that resins characterized by substantial absence of colour and by high percentage acetal reaction may be produced employing sequential steps of hydrolysis and acetal reaction and using polymers of viscosities, hydrolysis products, concentrations in solution, solvents, percentages of hydrolysis, catalysts and temperatures, one or more of which are outside their respective ranges as already disclosed.

Examples 12 to 14 and the teaching in connection therewith cover variations of a process in which hydrolysis and acetal reaction are carried out sequentially to produce resins characterized by substantial absence of colour or by high percentage acetal reaction, or by both high percentage acetal reaction and substantial absence of colour, and in which the hydrolysis may be partial or complete.

The limits of water, alcohol, catalyst and temperature taught for obtaining resins characterized by high percentage acetal reaction apply equally to acetal reactions conducted simultaneously with or subsequently to hydrolysis.

Proceeding according to the teaching of the foregoing general statements and the examples and varying one or more, the proportions, times, temperatures, solvents, catalysts, carbonyl containing body and the viscosity of the polymer, and the polymer concentration in solution, one skilled in the art may produce resins of characteristics differing as desired from those herein specifically disclosed or may produce substantially identical products under different conditions of manufacture. While the process is preferably carried out at atmospheric pressure, the pressure may be above or below atmospheric.

The resins produced according to any of Examples 1 to 3 and 6 to 11 are suitable for manufacture of waterproof wrapping films and safety glass, also films for photographic purposes. The resins produced according to Examples 7, 8 and 11 are suitable for the manufacture of threads for artificial silk, those from the higher viscosity polymers being the best. Any of these resins are suitable for manufacture of high class surface coating compositions.

The resins of Examples 3 to 11 and 13 are useful as a coating for liners of bottle caps or as a lacquer for the caps themselves, owing to their insolubility in all ordinary solvents, non-toxicity and freedom from colour and odour.

The resins have good dielectric properties and all may be used as an insulating lacquer on wire, while those from the lower viscosity polymers may be used in moulding the insulating parts of electrical apparatus.

The conditions already described as to catalysts, solvents, water, temperatures, polymer viscosities and concentration in solution, pressure and percentage hydrolysis and acetal reactions apply in general also to cases in which the hydrolyzed polymer is condensed with an agent other than formaldehyde (or a body releasing formaldehyde in the reaction) and apply in particular when acetaldehyde (or a body releasing it in the reaction) is used, with the special observation that certain precautions in respect of water and/or alcohol concentrations and temperature are necessary to protect the acetaldehyde and the resin if a product of good colour and high percentage acetal reaction is to be obtained. In particular, the conditions as to high polymer viscosity, high percentage hydrolysis and high percentage acetal reaction, apply also in cases where other reactants characterized by an active carbonyl group, such as propylaldehyde, butyraldehyde, or benzaldehyde are used.

The pure resins are obtained by removing the catalyst acid and solvent. These operations may be performed in various ways and relations to the use of the resins. The catalyst acid may be neutralized in the original resin solution as described in connection with Example 1, or otherwise, and the resin solution then may be extruded in the form of sheets, films or threads into air or into a precipitation bath, dried for removal of solvent, washed free from salts and finally dried.

Alternatively, the resin solutions may be extruded without previous neutralization of the catalyst acid, washed for removal of acid and dried for removal of solvents.

The resins of this invention in film, thread or granule form may be treated for reduction in the percentage of free hydroxyl groups therein by exposing them to vapours of formaldehyde, phenyl isocyanate, ketene or other suitable material.

Proceeding in general along the lines already described, useful resins may be obtained from other polyvinyl esters, such as polyvinyl propionate and polyvinyl butyrate. Polyvinyl formate is believed to be an exception. When dealing with these other ester polymers, it is desirable that the alcohols, esters or aliphatic acids used as solvents be those corresponding to the polyvinyl ester, so as to avoid formation of mixed esters in the solvent. Thus, methyl, ethyl, propyl or butyl propionates and/or corresponding alcohols or propionic acid are preferable with polyvinyl propionate and similarly in the case of polyvinyl butyrate.

In the following claims, the expression "inorganic acid-reacting substance" is to be understood as including the mineral acids, sulphonic acids and strong semi-organic acids, such as trichloracetic acid and suitable acid-reacting salts. Likewise, in the claims, the terms "aldehyde" and "formaldehyde" are to be understood as including bodies capable of yielding an aldehyde or formaldehyde, as the case may be, in the reaction. In addition, the term "organic solvent" is to be understood as including solvent mixtures as well as individual solvent substances.

Having thus described our invention, what we claim is:—

1. A process of making substantially colourless polyvinyl resins characterized by a high percentage replacement of hydroxyl groups, which process comprises reacting on an hydrolysis product of a polyvinyl ester other than polyvinyl formate, in solution in an organic solvent, including a monohydric alcohol and the ester thereof, with an aliphatic acid corresponding to the polymer, with formaldehyde, in presence of a catalyst and water, the water and alcohol being present in amount between the minimum which will protect the aldehyde and the produced resin from discolouration by the catalyst and the maximum compatible with maintaining homogeneous reaction conditions when the acetal reaction exceeds 80%.

2. A process of making substantially colourless polyvinyl resins characterized by a high percentage replacement of hydroxyl groups, which process comprises reacting on an hydrolysis product of a polyvinyl ester other than polyvinyl formate, in solution in an organic solvent, including a monohydric alcohol and the ester thereof, with an aliphatic acid corresponding to the polymer, with benzaldehyde, in presence of a catalyst and water, the water and alcohol being present in amount between the minimum which will protect the aldehyde and the produced resin from discolourization by the catalyst and the maximum compatible with maintaining homogeneous reaction conditions when the acetal reaction exceeds 80%.

3. A process of making substantially colourless polyvinyl resins characterized by a high percentage replacement of hydroxyl groups which process comprises reacting together a polyvinyl ester other than polyvinyl formate in solution in an organic solvent, including a monohydric alcohol and the ester thereof with an aliphatic acid corresponding to the polymer, with formaldehyde and water in presence of an acid reacting catalyst, the water and alcohol being present in amount between the minimum which will protect the aldehyde and the produced resin from discolouration by the catalyst and the maximum compatible with maintaining homogeneous reaction conditions when the acetal reaction exceeds 80%.

4. A process of making substantially colourless polyvinyl resins characterized by a high percentage replacement of hydroxyl groups which process comprises reacting together a polyvinyl ester other than polyvinyl formate in solution in an organic solvent, including a monohydric alcohol and the ester thereof with an aliphatic acid corresponding to the polymer, with benzaldehyde and water in presence of an acid reacting catalyst, the water and alcohol being present in amount between the minimum which will protect the aldehyde and the produced resin from discolouration by the catalyst and the maximum compatible with maintaining homogeneous reaction conditions when the acetal reaction exceeds 80%.

5. A process of making polyvinyl resins characterized by a high percentage replacement of hydroxyl groups which comprises reacting on an hydrolysis product of a polyvinyl ester other than polyvinyl formate, in solution in an organic solvent including a monohydric alcohol and the ester thereof with a fatty acid corresponding with the polymer with an aldehyde chosen from the group consisting of the saturated aliphatic and aromatic aldehydes in presence of a catalyst and water, the amount of water and alcohol being less than would interfere with maintenance of homogeneous reaction conditions when the acetal reaction exceeds 80%.

6. A process of making polyvinyl resins characterized by a high percentage replacement of hydroxyl groups, which comprises reacting on an hydrolysis product of a polyvinyl ester other than polyvinyl formate, in solution in an organic solvent including a monohydric alcohol and the acetic acid ester thereof with an aldehyde chosen from the group consisting of the saturated aliphatic and aromatic aldehydes in presence of a catalyst and water, the alcohol being present in amount between 33% and 100% of that required to combine with all the aldehyde and the water being present in amount between 1% and 16% of the solution.

7. A process of making substantially colourless polyvinyl resins characterized by a high percentage replacement of hydroxyl groups, which process comprises reacting together a polyvinyl acetate in solution in an organic solvent including a monohydric alcohol and the acetic acid ester thereof, formaldehyde and water in presence of an acid reacting catalyst, the alcohol being present in amount between 33% and 100% of that required to combine with all the aldehyde and the water being present in amount between 1% and 16% of the solution.

8. A process of making substantially colourless polyvinyl resins characterized by a high percentage replacement of hydroxyl groups, which process comprises reacting together a polyvinyl acetate in solution in an organic solvent including a monohydric alcohol and the acetic acid ester thereof, benzaldehyde and water in presence of an acid reacting catalyst, the alcohol being present in amount between 33% and 100% of that required to combine with all the aldehyde and the water being present in amount between 1% and 16% of the solution.

9. A process of making polyvinyl resins characterized by a high percentage replacement of hydroxyl groups, which comprises reacting on an hydrolysis product of a polyvinyl acetate, in solution in an organic ester-alcohol mixture as solvent, with an aldehyde chosen from the group consisting of the saturated aliphatic and aromatic aldehydes in presence of a catalyst and water, the water being present in amount less than would interfere with maintenance of homogeneous reaction conditions when the acetal reaction exceeds 80% and less than 16% of the solution.

10. A process of making substantially colorless polyvinyl resins, which comprises reacting on an hydrolysis product of a polyvinyl ester other than polyvinyl formate with an aldehyde chosen from the group consisting of the saturated aliphatic and aromatic aldehydes in presence of a catalyst, water and an organic solvent, the proportions of water and solvent being adjusted to maintain homogeneous reaction conditions when the hydrolysis is 80% and over and the acetal reaction exceeds 80%, the water being present in amount sufficient to protect the aldehyde and the formed resin against discolouration by the catalyst.

11. A process of making substantially colorless polyvinyl resins, which comprises reacting together a polyvinyl ester other than polyvinyl formate, in solution in an organic solvent, an aldehyde chosen from the group consisting of the saturated aliphatic and aromatic aldehydes and water in presence of a catalyst, the proportions of water and solvent being adjusted to maintain homogeneous reaction conditions when the hydrolysis is 80% and over and the acetal reaction exceeds 80%, the water being present in amount sufficient to protect the aldehyde and the formed resin against discolouration by the catalyst.

12. A process of making substantially colorless polyvinyl resins which comprises reacting on an hydrolysis product of a polyvinyl ester other than polyvinyl formate with an aldehyde chosen from the group consisting of the saturated aliphatic and aromatic aldehydes in presence of a catalyst, water and an organic solvent capable of and present in amount sufficient for maintaining homogeneous reaction conditions when the acetal reaction is 90% complete or more, the water being present in amount sufficient to protect the aldehyde and the formed resin against discolouration by the catalyst.

13. A process of making substantially colorless polyvinyl resins which comprises reacting on an hydrolysis product of a polyvinyl acetate with benzaldehyde in presence of a catalyst, water and an organic solvent capable of and present in amount sufficient for maintaining homogeneous reaction conditions when the acetal reaction is 90% complete or more, the water being present in amount sufficient to protect the aldehyde and the formed resin against discolouration by the catalyst.

14. A process of making polyvinyl resins which comprises reacting on an hydrolysis product of a polyvinyl ester other than polyvinyl formate with formaldehyde in presence of a catalyst, water and an organic solvent capable of and present in amount sufficient for maintaining homogeneous reaction conditions when the acetal reaction is 90% complete or more, the water being present in amount sufficient to protect the formed resin and the aldehyde against discolouring action of the catalyst.

15. A process of making polyvinyl resins which comprises reacting on an hydrolysis product of a polyvinyl ester other than polyvinyl formate with benzaldehyde in presence of a catalyst, water and an organic solvent capable of and present in amount sufficient for maintaining homogeneous reaction conditions when the acetal reaction is 90% complete or more, the water being present in amount sufficient to protect the formed resin and the aldehyde against discolouring action of the catalyst.

16. A process of making polyvinyl resins which comprises reacting on an hydrolysis product of a polyvinyl ester other than polyvinyl formate with formaldehyde in presence of a catalyst, water and an organic solvent including an alcohol, the solvent being capable of and present in amount sufficient for maintaining homogeneous reaction conditions when the acetal reaction is 90% complete or more and the water and alcohol being present in amount sufficient to protect the formed resin and the aldehyde against discolouring action of the catalyst.

17. A process of making polyvinyl resins which comprises reacting on an hydrolysis product of a polyvinyl ester other than polyvinyl formate with benzaldehyde in presence of a catalyst, water and an organic solvent including an alcohol, the solvent being capable of and present in amount sufficient for maintaining homogeneous reaction conditions when the acetal reaction is 90% complete or more and the water and alcohol being present in amount sufficient to protect the formed resin and the aldehyde against disclouring action of the catalyst.

18. A process of making polyvinyl resins which comprises reacting on an hydrolysis product of a polyvinyl acetate with formaldehyde in presence of a catalyst, water and an organic solvent capable of and present in amount sufficient for maintaining homogeneous reaction conditions when the acetal reaction is 90% complete or more, the water being present in amount sufficient to protect the formed resin and the formaldehyde against discolouring action of the catalyst.

19. A process of making substantially colorless polyvinyl resins which comprises reacting on an hydrolysis product of a polyvinyl acetate having a viscosity of at least 10 centipoises with an aldehyde chosen from the group consisting of the saturated aliphatic and aromatic aldehydes in presence of a mineral acid as catalyst, water and an organic solvent capable of and present in amount sufficient for maintaining homogeneous conditions when the acetal reaction is over 90% of completion, the water being present in amount sufficient to protect the aldehyde and the formed resin against discolouration by the catalyst.

20. A process of making substantially colorless polyvinyl resins which comprises reacting together, a polyvinyl acetate having a viscosity of at least 10 centipoises, water and an aldehyde chosen from the group consisting of the saturated aliphatic and aromatic aldehydes in presence of a mineral acid and an organic solvent until hydrolysis proceeds to at least 80% of completion and the acetal reaction proceeds to at least 90% of completion, the water being present in amount sufficient to protect the aldehyde and the formed resin against discoloration by the catalyst.

21. A process of making substantially colourless polyvinyl resins, which comprises reacting together, a polyvinyl acetate in solution in an organic solvent, formaldehyde and water in presence of sulphuric acid as catalyst, the sulphuric acid being present in amount less than 10% of the polymer solution and the water being present in amount sufficient to protect the aldehyde and the formed resin from discolouration by the catalyst acid and in any case more than 1% of the polymer solution, the ratio of catalyst acid to water ranging downwards from a maximum of the order of between 1:1 and 1:3 for a reaction temperature of approximately 70° C.

22. A process of making substantially colourless resins which comprises reacting together, a polyvinyl acetate in solution in an organic solvent comprising a monohydric alcohol and the acetic acid ester thereof, formaldehyde and water in presence of sulphuric acid as catalyst, the sulphuric acid being present in amount less than 10% of the polymer solution and the water being present in amount sufficient to protect the aldehyde and the formed resin from discolouration by the catalyst acid and in any case more than 1% of the polymer solution, the ratio of catalyst acid to water ranging downwards from a maximum of the order of 1:1 for a reaction temperature of approximately 70° C.

23. A process of making substantially colourless polyvinyl resins which comprises reacting on an hydrolysis product of a polyvinyl ester other than polyvinyl formate with an aldehyde chosen from the group consisting of the saturated aliphatic and aromatic aldehydes, in presence of a catalyst, water and an organic solvent including an alcohol and being capable of and present in amount sufficient for maintaining homogeneous reaction conditions when the acetal reaction is 90% complete or more, the water and alcohol being present in amount sufficient to protect the aldehyde and the formed resin against discolouration by the catalyst.

GEORGE O. MORRISON.
AUBREY F. PRICE.